United States Patent [19]

DeCaussin

[11] 3,898,911

[45] Aug. 12, 1975

[54] REMOTELY OPERATED DRAW BAR TOOL CHANGER

[75] Inventor: David Edward DeCaussin, Northridge, Calif.

[73] Assignee: Fadel Engineering Co., North Hollywood, Calif.

[22] Filed: Aug. 26, 1974

[21] Appl. No.: 500,443

[52] U.S. Cl.............. 90/11 D; 408/1; 408/141; 408/239 D; 173/163
[51] Int. Cl.² ........................................ B23C 5/26
[58] Field of Search ........ 90/11 D; 408/239 D, 141, 408/1; 173/163

[56] References Cited
UNITED STATES PATENTS

| 3,374,711 | 3/1968 | Saunders | 408/239 A X |
| 3,823,642 | 7/1974 | Jerue | 90/11 D |
| 3,835,858 | 9/1974 | Hagen | 408/141 X |

Primary Examiner—Gil Weidenfeld
Attorney, Agent, or Firm—Singer & Singer

[57] ABSTRACT

A remotely operated draw bar for enhancing the removal or insertion of tool holders. The draw bar contains a threaded portion at one end for connection to suitable tool holders. The other end that extends through the spindle is splined for mating with a spindle having mating splined portions. The spindle is held in a non-engaging relationship with the draw bar and is remotely operated to move in an axial direction into an engaging relationship with the draw bar. The driving motor is energized in a direction depending upon whether the tool holder is being inserted or removed. Engagement between the spline on the spindle and the splines on the draw bar is enhanced by momentarily causing the spindle to rotate as the spindle is moved from a non-engaging position to an engaging position with the draw bar. Upon being fully engaged the spindle is powered in the rotary direction depending upon the function being desired.

8 Claims, 4 Drawing Figures

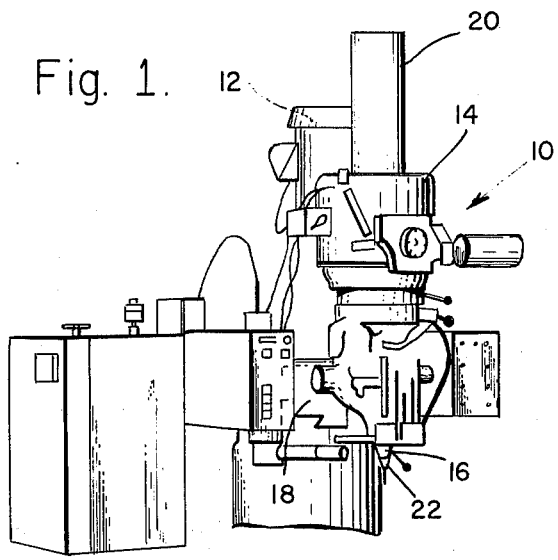
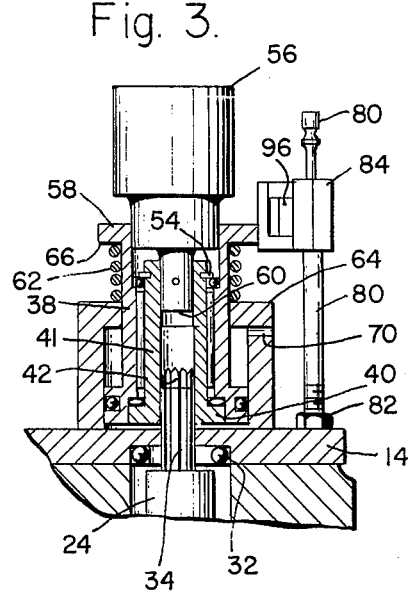
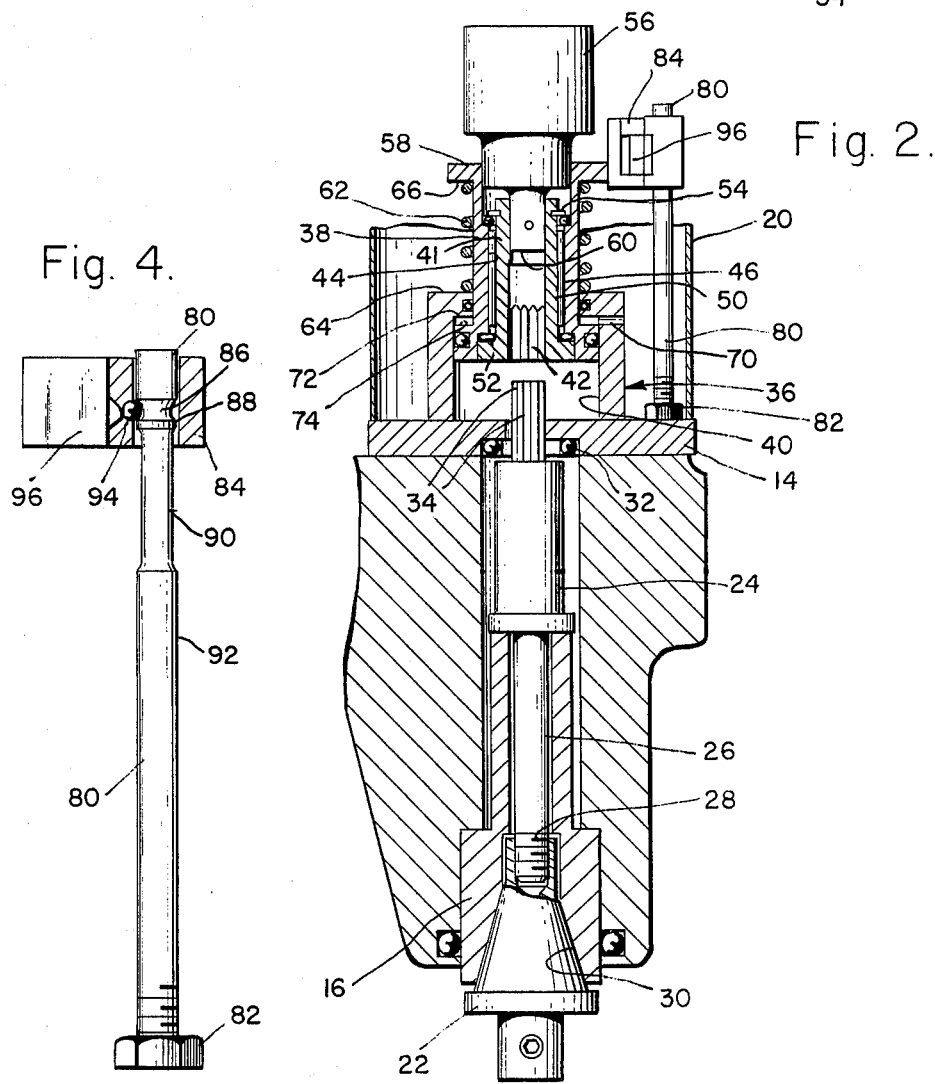

REMOTELY OPERATED DRAW BAR TOOL CHANGER

This invention relates to a remotely operated draw bar tool changer that may be either operated by the operator of the machine tool when changing tool holders or may be part of a complete system for allowing complete automation of a machine tool of the type described in co-pending application entitled Removable Attachment for Automating Milling Machines filed Feb. 2, 1973, Ser. No. 329,111, and assigned to the same assignee as the present invention.

In the conventional milling machine of the type manufactured by the Bridgeport Company, the tool holder is held in the spindle by a draw bar extending through the spindle to the top of the drive mechanism where it is terminated by a locking nut. In the normal operation of changing tool holders the operator must first stop the spindle, then loosen the locking nut which allows the tool holder to be removed. A new tool holder is then inserted and the lock nut tightened to maintain the tool holder within the spindle for the next operation.

In order to practice and utilize the automatic features of the referred-to invention, it was necessary to automate the insertion and removal of the tool holder into the spindle. In one embodiment an impact wrench operated either by an electrical motor or an air motor is connected to the top of the machine over the locking nut which either tightens or loosens the tool holder depending on the direction of rotation of the impact motor.

In one embodiment a conventional impact tool motor operated by air is connected to the locking nut with two separate air lines controlled by a valve which allows the operator to energize the motor in one direction to tighten or in the alternative to energize the motor in the opposite direction to loosen the tool holder.

The operation of either inserting or removing a tool holder takes place when the machine is turned off and the draw bar is in the uppermost position in order to allow the socket wrench associated with the impact motor to engage the locking nut.

Experience over a period of time has demonstrated occasional problems with the socket wrench engaging the locking nut on the draw bar. Experience has shown that the socket wrench did not always seat perfectly on the locking nut and that as a result direct contact between forcing the socket on the locking nut resulted in damage to either the socket or the nut which unduly affected reliability and consistent operation over a long period of time.

A basic improvement in remotely locking and unlocking the draw bar has resulted in the use of a spindle adapted to be moved axially.

The spindle is driven by a suitable rotating device such as an air impact motor or an electrically operated impact motor. The shaft of the draw bar is splined and in a similar manner the spindle is splined for mating with the splines on the draw bar.

The spindle and drive motor assembly is spring loaded in order to maintain the complete assembly in a first non-engaging position with respect to the draw bar.

The spindle and drive motor assembly is adapted to move axially into a second position whereby the splines on the spindle and the splines on the draw bar are in a mating driving relationship. The driving motor being attached to the spindle therefore rotates the spindle and at the same time rotates the draw bar in a direction determined by either the operator or by automatic control equipment.

Operation of the remotely operated draw bar tool changer was highly successful when controlled by a human operator, however, it was soon discovered that in completely automatic operations of the type described in the referenced patent application, that serious clashing of splines took place between the splines on the spindle and the splines on the draw bar.

Experience and research soon indicated that the manual operator in remotely operating the spindle to move in the axial direction could hear the clash of splines between the spindle and the draw bar. In such a condition the operator invariably reversed the axial direction and repeated the process until mating was successfully accomplished between the splines and without unnecessary damage to the splines during the mating relationship.

In the automatic mode operation, where the change of the tool holder is under control of a programmed device, it was soon discovered that energizing the spindle to move in an axial direction resulted in a brute force attempt to force the splines on the spindle to mate with the splines on the draw bar on the first attempt regardless of whether the splines were aligned or even slightly off from each other. The brute force system was successful and did in fact operate satisfactorily since the spindle is free to rotate and upon contacting splines on the draw bar the spindle was capable of rotating the small amount necessary to become more properly aligned and mate. Unfortunately, the process caused impact damage at the point of contact between the splines on the spindle and the splines on the draw bar over a long period of time unduly shortening the life of the parts and requiring replacement sooner than anticipated.

In the present invention there is described a method and means for causing a proper mating between the splines on the spindle and the splines on the draw bar that is simple and effective and consistently reproduceable whether operated by programmed computers or by man operators.

The present invention eliminates the clashing of gears by momentarily impulsing the drive motor when the spindle assembly initially moves from the non-engaging position towards the engaging position.

The drive motor is momentarily impulsed and then turned off in order to supply a slight rotational force to the spindle thereby allowing the spindle and drive motor shaft to freely rotate at very low speed in a free wheeling relationship.

The axial movement of the spindle and motor assembly continues until the splines on the spindle contacts and mates fully with the splines on the draw bar. The slightly rotating spindle and drive motor shaft allow the spline on the spindle to find the corresponding mating position with the splines on the fixed draw bar thereby allowing a complete mating of the splined shafts on the draw bar with the splines on the spindle. The slight rotational speed of the spindle provides the necessary camming action between the splines on the spindle and the splines on the draw bar to assure a complete engagement without damage or contacting of the mating portions of the splined shafts.

Further objects and advantages of the present invention will be made more apparent by referring now to the accompanying drawing wherein:

FIG. 1 is a front view of a milling machine incorporating the remotely operated draw bar tool changer;

FIG. 2 is a partial cross-section of the spindle head illustrated in FIG. 1;

FIG. 3 is a partial cross-section showing the remotely operated draw bar tool changer in an operating or engaged position; and FIG. 4 is a partial cross-section of the switch bar illustrated in FIG. 2.

Referring now to FIG. 1, there is shown a conventional milling machine 10 having a spindle drive motor 12, a gear housing 14, and a machine spindle 16 located on a spindle carriage 18 adapted to move in a fore and aft direction on suitable guides not illustrated.

A housing 20 located on the gear housing 14 completely covers the remotely operated draw bar tool changer located within. The machine spindle 16 contains a draw bar coaxial with the machine spindle that is adapted to threadedly engage a tool holder 22.

Referring now to FIG. 2, there is shown a partial cross section of the remotely operated draw bar tool changer adapted to remotely attach or remove the tool holder 22 from within the machine spindle 16.

A draw bar 24 is fixedly attached to a rod 26 that is threaded at one end 28 for insertion into mating threaded portions located on the tool holder 22. Rotating the draw bar 24 in a first direction causes the thread portions 28 to draw the tool holder 22 against the tapered portions 30 located on the machine spindle so as to fixedly hold the tool holder against the machine spindle in a rigid configuration. Rotating the draw bar 24 in the opposite direction causes the tool holder 22 to be released from the machine spindle 16.

The draw bar 24, threaded rod 26, and machine spindle are suitably supported within the gear housing 14 by suitable thrust bearings 32 that allow the draw bar to be rotated in either direction in accordance with the command operations from the spindle drive motor 12 illustrated in FIG. 1.

The uppermost portion of the draw bar 24 contains a plurality of splines 34 that is adapted to project beyond the gear housing 14 when the machine spindle 16 is in the uppermost position.

Fixedly attached to the gear housing 14 and aligned with the draw bar 24 is a cylinder 36. A moveable piston 38 is partially located within the internal walls 40 of the cylinder 36. The piston 38 is adapted to move axially within the piston 36 and in a sealing relationship with respect to the inside wall member 40 of the cylinder 36.

A spindle 41 having internal splines 42 similar to the splines 34 located on the draw bar 24 is rotatably mounted within the internal surface 44 of the piston 38. A bearing member 46 is located between the inside walls 44 of the piston 38 and the outside walls 50 of the spindle 40 thereby allowing the spindle to rotate in either direction about its axis. A set of thrust bearings 52 and 54 located at either end of the spindle 41 maintain the spindle in a fixed relationship with respect to the piston 38 thereby causing the spindle to move axially as the piston moves and at the same time allow the spindle to rotate freely within the confines of the supporting piston.

An impact wrench 56 is fixedly attached to the uppermost portion of the piston 38 by means of a circumferential collar 58. In other words, the collar 58 holds the impact wrench 56 and the piston 38 in a fixed relationship with respect to each other thereby causing the collar 58 and the impact wrench 56 to move axially as the piston 38 moves.

The impact wrench 56 includes a centrally located rotatable shaft 60 mating with the uppermost portion of the spindle 41 in a driving relationship whereby rotation of the impact wrench shaft causes the spindle to rotate in the same direction.

A compression spring 62 is located between the uppermost outside surface 64 of the piston 38 and the lowermost surface 66 of collar 58 for maintaining the splines 42 on the spindle 41 in a non-engaging position with respect to the spline 34 on the end of the draw bar 24.

A review of FIG. 2 will show that the complete moveable assembly comprises the impact wrench 56, the collar 52, the piston 38, the bearing 46, and thrust bearings 52 and 54, and the spindle 40.

The compression spring 62 has the effect of maintaining the complete moveable assembly just described in an upward non-engaging position as illustrated in FIG. 2.

Movement of the complete assembly attached to the piston 38 is occasioned by means of an opening 70 located on one wall of the cylinder 36 that communicates with the inside chamber of the piston in an area where surface 72 located on the cylinder 36 contacts surface 74 located on the moveable piston 38. Air under pressure forced into the opening 70 results in a pressure being exerted on surface 74 of the piston 38 thereby causing the piston to move downward in an axial position so as to compress the compression spring 62. The complete movement of the piston 38 is sufficient to allow the splines 42 on the spindle 40 to engage with the splines 34 on the draw bar 24. This condition will be maintained as long as air under pressure is inserted within the opening 70. Releasing the air pressure entering the opening 70 thereby allows the compression spring 62 to return the complete assembly mounted on the piston 38 into the normal position shown in FIG. 2.

Referring now to FIG. 3, a review will show and illustrate the mating of the splines 42 and splines 34 with air inserted within the opening 70.

Referring now to FIG. 2 and FIG. 4, there is shown a substantially vertical switch rod 80 fixedly attached to the gear housing 14 by means of a suitable lock nut 82. A switch bracket 84 contains a cylindrical opening at one end for accepting the switch rod 80 and is fixedly attached at the other end to the collar 58. The switch bracket 84 will therefore move in an up and down motion traversing the switch rod 80 as the collar 58 moves.

As shown in FIG. 4, the switch rod 80 is constructed with a first depressed portion 86, a relatively short land portion 88, a substantially longer depressed portion 90 and a full width portion 92.

Mounted on the switch bracket 84 is a captive ball bearing 94 located in the switch bracket assembly in such a manner as to ride on the switch rod 80 and move within the depressions 86 and 90 located on the switch rod.

A microswitch 96 is also mounted upon the switch bracket in such a manner so as to continuously urge the ball bearing 94 against the camming surfaces of the switch rod 80 whereby the depressed portions 86 allow the ball bearing to move inward and hence turn the microswitch 96 into an Off position while the ball bearing contacting the raised portion 88 and 92 force the ball bearing out and against the microswitch thereby causing the microswitch to be turned onto an On condition.

Assuming that the impact wrench 56 is electrically driven, the microswitch 96 is connected in series with the power supply feeding the impact wrench. If we assume the impact wrench is pneumatically driven, then the microswitch 96 is connected to a pressure sensitive switch capable of turning the pneumatic controls into an On condition with the switch 96 in an energized condition.

A review of the operation of the remotely operated draw bar tool changer will show that inserting air under high pressure into opening 70 of the cylinder 36 will cause the piston 38 to begin moving in a downward direction carrying with it the switch bracket 84 and the microswitch 96. Initially the ball bearing 94 is located on the depressed land position 86 located on the switch rod 80 thereby keeping the impact wrench 56 in an Off condition until the ball bearing contacts the raised land position 88.

The raised land position 88 is physically located close to the starting or home position as illustrated in FIG. 2 and will immediately and momentarily supply power to the impact wrench 56 thereby causing the centrally located shaft 60 to rotate. Continued movement of the piston 38 in a downward direction allows ball bearing 94 to contact the depressed land position 90 on the switch rod 80 again removing all power to the impact wrench 56 thereby allowing the shaft 60 to simply coast from the initial momentary burst of power and at relatively low speeds.

The length of the depressed land position 90 representing an Off position for the microswitch 96 will continue until the splines 42 on the spindle 40 engage with the splines 34 located on the draw bar 32. At that time before final seating takes place the ball bearing 94 will be urged out by the raised portion 92 thereby causing the microswitch 96 to close, resulting in the impact wrench 56 to be energized.

The pneumatics necessary to insert high pressure air into opening 70 can be either controlled by hand or may be automatically controlled as indicated in my referred-to patent. In addition, the direction of rotation of the impact wrench 56 is also determined by outside considerations and may be hand operated or automatically controlled in a similar fashion as described in my referred-to patent.

I claim:

1. A machine tool having a draw bar located in a machine head and adapted to be connected to a tool holder at one end and to a remotely operated spindle at the other end for rotating said draw bar comprising:
    one end of said spindle and said other end of said draw bar having interengaging means,
    means for moving said spindle in an axial direction from a non-interengaging position with respect to said draw bar to an interengaging position,
    means for automatically and slightly rotating said spindle as said spindle is moved from said non-interengaging position and before reaching said interengaging position with said draw bar, and
    means for automatically and fully rotating said spindle upon said spindle being interengaged with said draw bar whereby said tool holder is tightened or loosened depending upon the direction of rotation of said spindle.

2. A machine tool according to claim 1 in which said spindle is maintained in said non-interengaging position by means of a compression spring and air pressure moves said spindle in said interengaging position against said compression spring.

3. A machine tool according to claim 1 which includes a microswitch normally in an Off position and cam means for actuating said switch as said spindle moves in said axial direction, said cam means being operable for momentarily placing said switch in an On position and then in an Off position thereby causing said spindle to rotate before being interengaged with said draw bar.

4. A machine tool according to claim 3 in which said cam means includes a cam for placing said switch in an On position after said spindle is interengaged with said draw bar, thereby rotating said spindle while interengaged with said draw bar.

5. A machine according to claim 4 in which said cam means includes a single cam in the form of an axial shaft having suitable cutouts for momentarily operating said microswitch when said spindle is first moved in an axial direction and suitable cutouts for continuously rotating said spindle after interengagement with said draw bar.

6. A machine tool having a draw bar located in the machine head and adapted to be connected to a tool holder at one end comprising:
    said draw bar at the other end having interengaging portions,
    a spindle having complementary interengaging portions for engagement, with said draw bar, means supporting said spindle for rotation and for axial movement from a non-interengaging position to an interengaging position,
    means for moving said spindle from said non-interengaging position to said interengaging position whereby said spindle and said draw bar are in a driving relationship, and
    means for automatically and slightly, rotating said spindle as said spindle is moved from said non-engaging position thereby causing said spindle to rotate before reaching said interengaging position.

7. A machine tool having a draw bar located in the machine head and adapted to be connected to a tool holder at one end comprising:
    said draw bar at the other end having interengaging portions,
    an axially moveable piston aligned with said draw bar and adapted to move axially,
    a spindle having complementary interengaging portions for interengaging with said draw bar rotationally supported within said piston for axial movement from a non-interengaging position to a interengaging position with said draw bar,
    means for moving said piston from said non-interengaging position to said interengaging position whereby said spindle and said draw bar are in a driving relationship, and
    means for automatically and slightly rotating said spindle as said spindle is moved from said non-interengaging position and before said spindle is moved into said interengaging position thereby causing said spindle to rotate before interengaging with said draw bar.

8. A machine tool having a draw bar located in the machine head and adapted to be connected to a tool holder at one end comprising:

said draw bar at the other end having a plurality of splines, a cylinder assembly completely covering and aligned with said splines, a piston located partially within said cylinder and aligned with said splined draw bar and being movable axially from a normal position to an extended position, a spindle rotationally supported within said piston for axial movement therewith from said normal position to said extended position, said spindle having a splined surface for mating with said splined draw bar in a driving relationship, means for moving said piston from said normal position to said extended position whereby said spindle and said draw bar are in said driving relationship, and means for automatically and slightly rotating said spindle as said spindle is moved from said normal position and before said spindle is moved into said driving relationship, whereby said spindle engages fully with said draw bar before full rotational power is applied to said spindle.

* * * * *